United States Patent
Shinkarenko et al.

(10) Patent No.: US 12,363,053 B1
(45) Date of Patent: Jul. 15, 2025

(54) NETWORK REQUEST RESPONSE

(71) Applicant: Conviva Inc., Foster City, CA (US)

(72) Inventors: Konstantin Shinkarenko, Prague (CZ); Rama Chandra Sarath Gunuganti, Bengaluru (IN); Hubert C. Lin, San Francisco, CA (US); Santhanaraj Muthusamy, Bengaluru (IN)

(73) Assignee: Conviva Inc., Foster City, CA (US)

( * ) Notice: Subject to any disclaimer, the term of this patent is extended or adjusted under 35 U.S.C. 154(b) by 0 days.

(21) Appl. No.: 18/941,472

(22) Filed: Nov. 8, 2024

Related U.S. Application Data (60) Provisional application No. 63/597,661, filed on Nov. 9, 2023.

(51) Int. Cl.
 *H04L 49/9005* (2022.01)
 *G06F 11/3668* (2025.01)
 *G06N 3/10* (2006.01)
 *H04L 43/028* (2022.01)

(52) U.S. Cl.
 CPC ...... *H04L 49/9005* (2013.01); *G06F 11/3692* (2013.01); *G06N 3/10* (2013.01); *H04L 43/028* (2013.01)

(58) Field of Classification Search
 CPC ........ H04L 43/028; G06N 3/10; G06N 3/045; G06N 3/08; G06F 16/24568; G06F 16/2379; G06F 16/245; G06F 11/3692; G06F 11/3688; G06F 11/1658
 See application file for complete search history.

(56) References Cited

U.S. PATENT DOCUMENTS

| | | | |
|---|---|---|---|
| 2022/0036177 A1* | 2/2022 | Sriharsha | G06N 3/10 |
| 2023/0385288 A1* | 11/2023 | Kulkarni | H04L 49/9005 |
| 2024/0378122 A1* | 11/2024 | Smith | G06F 11/3692 |

* cited by examiner

Primary Examiner — Kyung H Shin
(74) Attorney, Agent, or Firm — Van Pelt, Yi & James LLP (57) ABSTRACT

In various embodiments, a process includes obtaining, from a first entity external to a client device, a data capture configuration specifying fields permitted to be captured on the client device from a network request and/or a corresponding network response. The process includes intercepting, on the client device, the network request and/or the corresponding network response. The network request may be generated by the application and associated with an application event. In response to intercepting the network request and/or the corresponding network response, the process determines the fields permitted to be captured based at least in part on the data capture configuration and captures select field-value pairs from a header and/or a body of the network request and/or a corresponding network response according to the data capture configuration. The process includes reporting, to a second entity external to the client device, the captured select field-value pairs.

28 Claims, 5 Drawing Sheets

≡ Monitoring Module Dashboard

| Metrics | Custom | Dimension | Mapped Events | Blocked Events | Configured Network Comms |

Disclaimer: I hereby certify that the specified fields (keys) do NOT contain any sensitive or personal data and authorize the content distribution monitor to collect these fields by the monitor.

Total 4 Items

Browse Configuration    [+ Add New]

Update User
─────────────────
Live Activity
─────────────────
Machine Learning    [Editing]
─────────────────
Login URL Condition Target URLs: [Contains... ▼]  [app-us2.example.com]   [+ Add]

Set Collection Rules

Request Header: [Input here...]   [+ Add]

Request Body: [loginID.key] [password.key]   [+ Add]

Response Header: [Input here...]   [+ Add]

Response Body: [Input here...]   [+ Add]

FIG. 5

NETWORK REQUEST RESPONSE

CROSS REFERENCE TO OTHER APPLICATIONS

This application claims priority to U.S. Provisional Patent Application No. 63/597,661 entitled NETWORK REQUEST RESPONSE filed Nov. 9, 2023 which is incorporated herein by reference for all purposes.

BACKGROUND OF THE INVENTION

In network communications, clients and servers communicate via requests and responses. A response code, such as a three-digit HTTP status code that a server sends to a client, indicates a result of a request made by the client. Response codes are intended to provide insight to the network communications. For example, HTTP status codes may be broadly categorized into five main classes: 1XX for informational (e.g., 100 Continue), 2XX for successful (e.g., 201 Created), 3XX for redirection (e.g., 301 Moved Permanently), 4XX for client error (e.g., 400 Bad Request), and 5XX for server error (e.g., 500 Internal Server Error). These examples show that the standard response codes may not provide enough information because they are only single-word or few-word phrases. Therefore, the standard response codes that are conventionally used may not be sufficient for network analytics, and may even provide misleading information about the actual state of the network. Thus, there is a need to better evaluate network communications such as network request responses to determine the true state of network communications.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Network components may interact with each other by making network requests (e.g., via application programming interface or API calls) and receiving network responses. For example, when an application running on a client device wishes to play a video, the application may make a request to a content server for the video file. Conventionally, there are standard ways of communicating whether a network request is successful, such as response code 200 for a server successfully fulfilling a request, response code 400 for a bad request that a server cannot process due to a client-side error, response code 500 for an internal server error when a server encounters an unexpected condition preventing it from fulfilling the client request, among others. However, standard response codes are sometimes not informative or may be misleading because they lack further details about the network communications.

An example of a misleading response code is a 200 success code being provided, when there is actually a problem preventing a workflow from proceeding. A server may determine that an API call was successfully made and issue the 200 code, when actually there was a problem with the information contained in the API call so that the intended request, while successfully received by the server, is not adequate for the workflow to proceed. For example, a job application request with a resume attachment may be received, but after reviewing the resume, the server automatically determines not to proceed with an interview process.

Conventional network analysis techniques typically consider only a response code, and therefore may be overlooking useful information such as response messages that developers of an application intentionally included in a response message such as in a response header or body (rather than the response code). One reason why conventional techniques do not typically look beyond the response code is that collecting additional information risks the capture of sensitive personally identifiable information (PII). For example, if a request includes a login with an email address, then capturing the email address would capture PII, which may violate privacy regulations or other best practices.

The disclosed techniques for analyzing a network response request include controlling client-side capture of data associated with network communications. A monitor may capture data to be used for analytics associated with a user or otherwise used to measure user experience, among other things. A user may have an application on a device such as a smartphone. Use of the application causes a network request to be sent to a backend and a corresponding network response to be received. An example usage of the application is an attempt to login or authenticate to a service. The monitor that captures data related to attempted login can determine aspects of this usage such as how a network response is processed.

A conventional method captures a response code alone. For example, the monitor receives the response code. However, the response code contains a limited amount of information. In the example of a login attempt, the code indicates that the request was received, but not the actual desired action, which is authenticating to a service. According to the disclosed techniques, additional information is captured from the header and/or the body of the response and/or the request to determine whether the actual desired action is successful. The disclosed techniques leverage useful information in request and response bodies (which developers typically do) by capturing that useful information, which conventional techniques do not capture because conventionally only a response code is considered.

Another conventional method would capture an entire response body. However, this is both memory/CPU-intensive and may violate privacy regulations by capturing PII. For example, capturing the entire response body is CPU-intensive and may negatively impact the functioning of the computer and increasing the latency. According to the disclosed techniques, data is captured in a selective and privacy-preserving way without over-burdening developers. Typically, selectively capturing data requires a great deal of coordination, technical implementation, and infrastructure such as creating different versions for different types of applications/platforms. The disclosed techniques respond to a need to better evaluate network communications such as network request responses to determine the true state of network communications and the underlying semantics of the responses, or requests, for the purposes of re-establishing the corresponding user experience related to the corresponding functionality dependent on the requests. The disclosed techniques may be deployed on the monitor dynamically without further customization from developers. The disclosed techniques capture select data to augment response codes and determine a more assessment picture of network communications.

Figure 1:
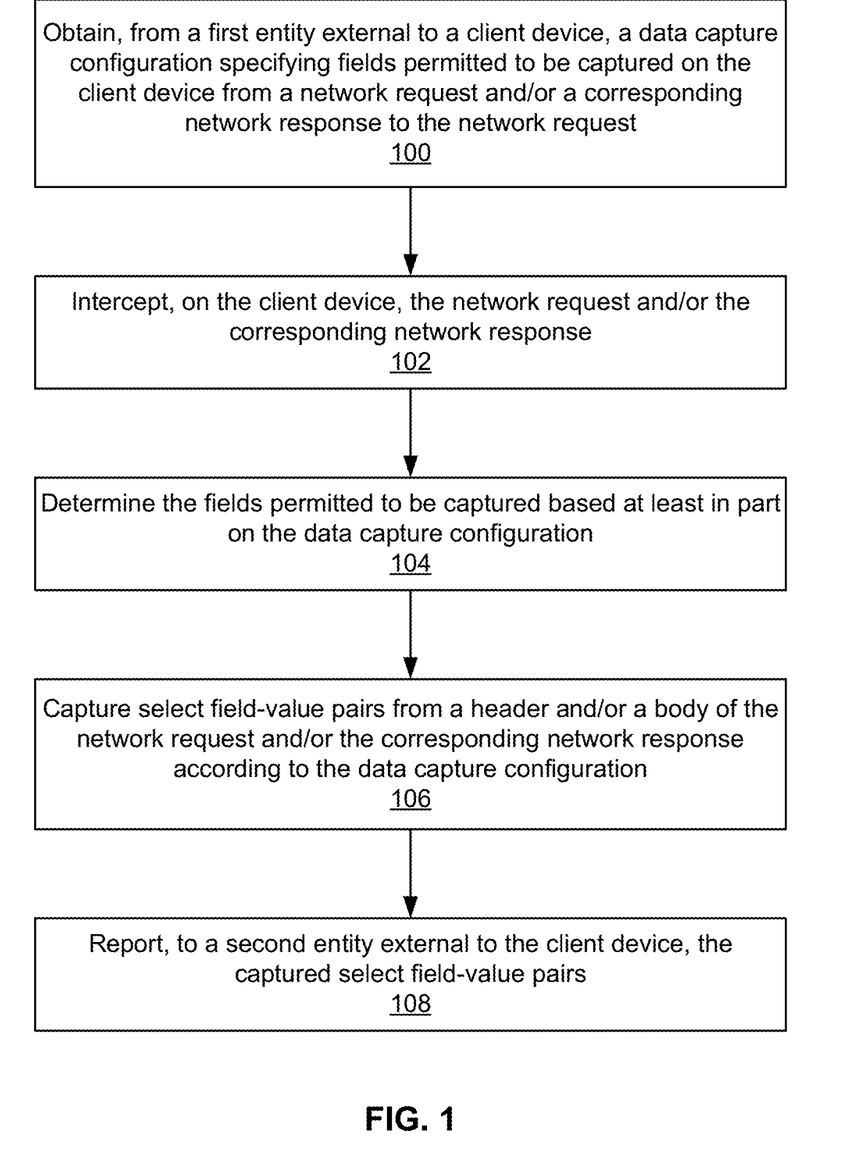
FIG. 1 is a flow diagram illustrating an embodiment of a process for controlling client-side capture of data associated with network communications.

FIG. 1 is a flow diagram illustrating an embodiment of a process for controlling client-side capture of data associated with network communications. This process may be implemented on or by the systems of FIGS. 2 and 3A-3B.

In the example shown, the process begins by obtaining, from a first entity external to the client device, a data capture configuration specifying fields permitted to be captured on the client device from at least one of a network request or a corresponding network response to the network request, wherein an application runs on the client device (100). The first entity external to the client device may be any entity that controls client-side capture of data such as a content distribution monitor further described with respect to FIG. 2.

The data capture configuration specifies fields that can be captured, collected, or otherwise extracted from network communications. In various embodiments, the data capture configuration is a file and is sometimes simply referred to as a "configuration file." The specified fields may have corresponding values, and together is referred to as a "field-value pair," as further described herein. In various embodiments, the data capture configuration includes a data model, and the data model includes at least one parameter, an example of which is further described with respect to FIG. 4.

A benefit of the data capture configuration is that it is application-agnostic, meaning developers do not need to write, debug, deploy, and otherwise maintain code for multiple platforms such as a respective version for an Android® application, an iOS® application, a Web application, etc. The data capture configuration accommodates heterogeneous requests from diverse types of clients on diverse types of operating systems. The data capture configuration may be distributed with or to a monitoring module on a client device, an example of which is further described with respect to FIGS. 3A and 3B. This enables the monitoring module, on the fly, to request specific information. The data capture configuration can also be updated to request different information. Thus, the data capture configuration is easily deployed and updated.

Another benefit of the data capture configuration is that it can be privacy preserving, meaning it can define specific fields to capture, where the fields to be captured do not contain PII. If a data capture configuration is not used, an entire response body may be captured but the entire response body may include PII, which violates best practices and privacy regulations. Thus, the data capture configuration ensures compliance with privacy regulations by capturing only those field that are specified to be captured, where the specified fields do not include PII.

Figure 3A:
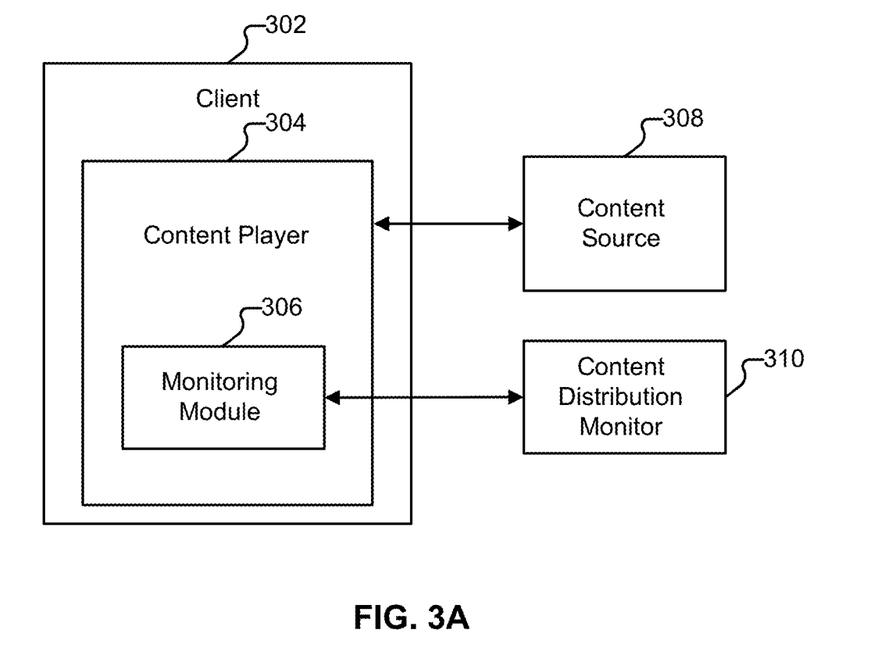
FIG. 3A illustrates an embodiment of a client including a content player.
Figure 3B:
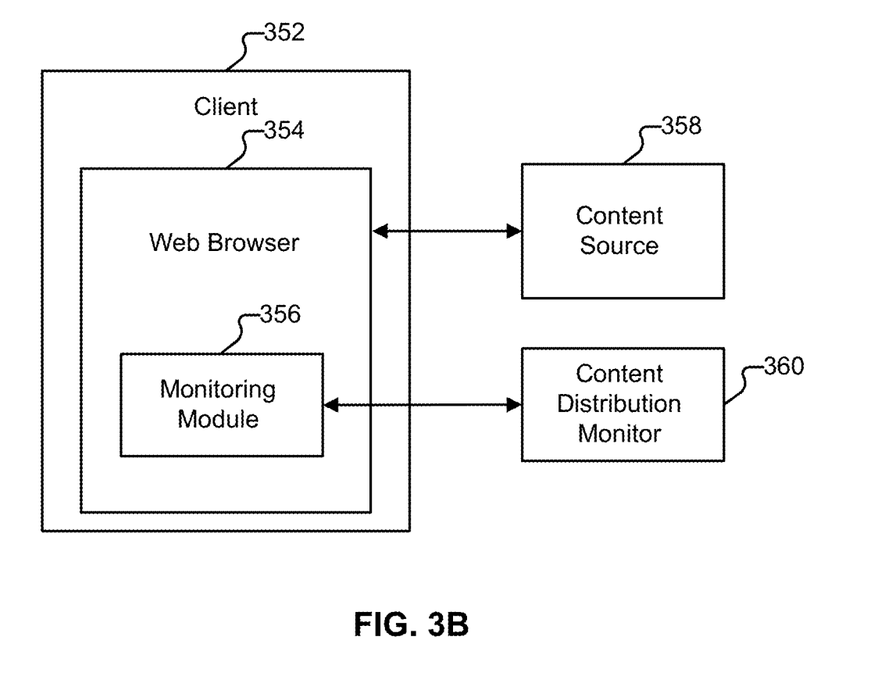
FIG. 3B illustrates an embodiment of a client including a web browser.

In various embodiments, the data capture configuration is obtained in response to initialization of the application. Referring briefly to FIG. 3A, an example of initialization of the application is opening content player 304. Referring briefly to FIG. 3B, an example of initialization of the application is opening web browser 354. The data capture configuration may be obtained in response to periodic refreshing of the application. For example, the periodic refreshing is performed at least every 30 minutes. This is beneficial where data capture configurations are updated, because the capturing of fields may be dynamically updated in response to data capture configuration updates.

The process intercepts, on the client device, at least one of the network request or the corresponding network response (102). The network request may be generated by the application. The network request may be associated with an application event such as an API call with respect to login. An example of a network request and response is further described with respect to FIG. 4.

The process determines the fields permitted to be captured based at least in part on the data capture configuration (104). Unlike conventional techniques that typically indiscriminately capture all of the content of a network response or capture only the network response code, the process here captures only those fields indicated by the data capture configuration. The process may obtain a list of fields to be captured from the data capture configuration and then proceed to obtain the values corresponding to the fields as follows.

The process captures select field-value pairs from at least one of a header or a body of the at least one of: a network request or a corresponding network response according to the data capture configuration (106). The field-value pairs (sometimes referred to as "key-value pairs") may be indicated by a developer, e.g., manually selected or defined. The selection of the field-value pairs may depend on observations made by the developer.

The field-value pairs may include custom field-value pairs, specific to a particular user or organization. Some examples of custom fields for a login success/failure situation are: error-message, error-code, data-userStatus, data-status, error-subcode, and error-description, an example of which is further described with respect to FIG. 4. The field-value pairs to be captured may be custom because the headers and bodies of responses and requests are customizable. For example, the HTTP standard permits XML or JSON and allows customization according to application logic, which is a protocol between the client application and the backend server of a particular application. For example, a front end developer coordinates with a backend developer to agree that a field status "success" in a response is treated as such by the requester.

The field-value pairs may include default field-value pairs. Examples of default field-value pairs include, without limitation: a URL associated with the network request, a time associated with the network request, or a status code associated with the corresponding network response.

The captured field-value pairs give a more accurate picture of a user experience compared with considering a response code alone. For example, a developer specifies particular field-value pairs to capture from the header of the request, the header of the response, the body of the request, and/or the body of the response. This allows application logic to be discovered or reconstructed to provide a meaningful narrative of a user experience. For example, the captured field-value pairs may indicate a user interacted with the application in a particular pattern or manner, the user visited a particular page, and the user clicked a particular button. As a result of the button click, the API request was made to a particular server. The server responded with a response code indicating success. However, inside the response body, there is a message that the user cannot be authenticated due to incorrect credentials. Such information may be determined by capturing a field-value pair.

In various embodiments, 104-108 are performed in response to intercepting the at least one of the network request or the corresponding network response.

Figure 2:
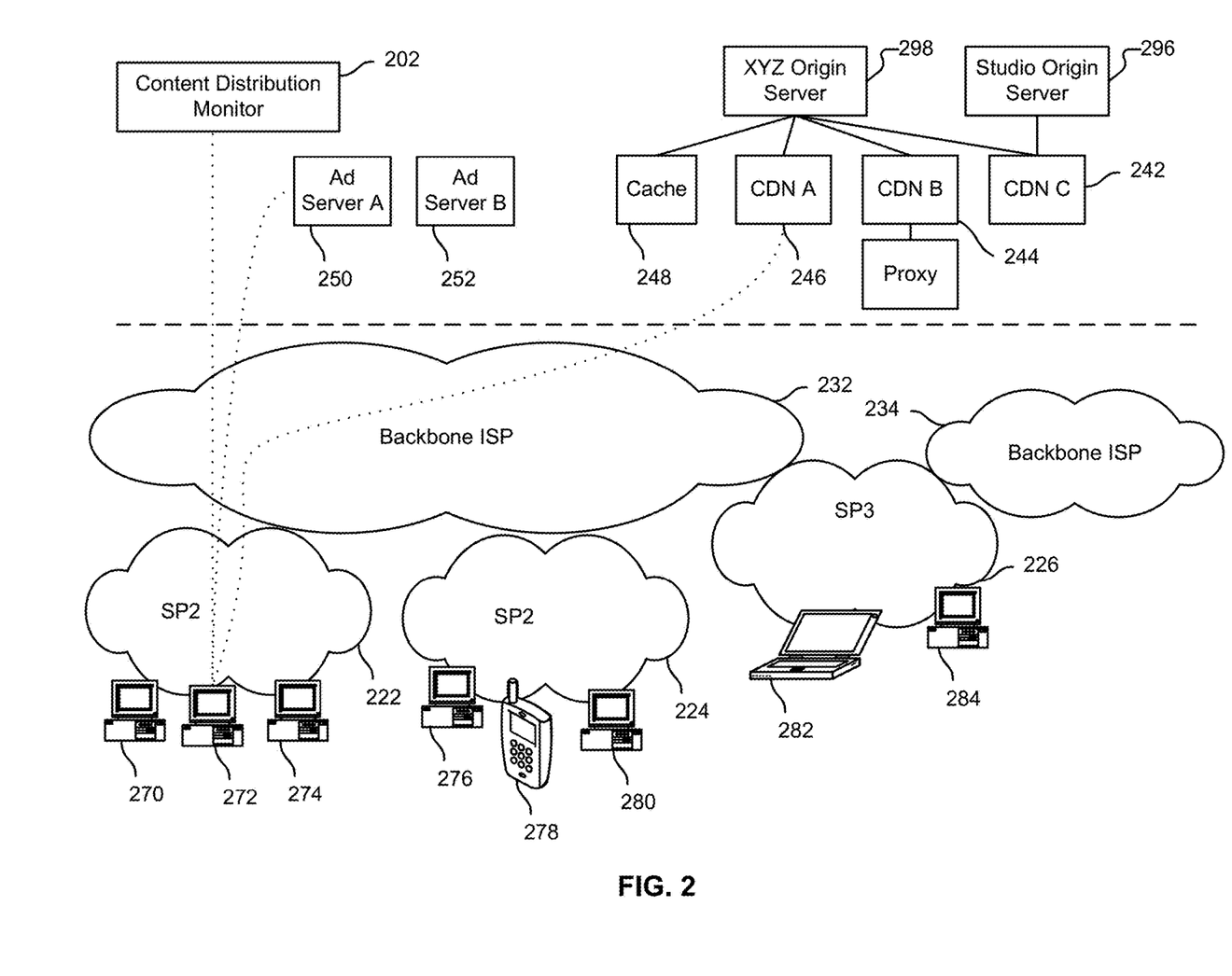
FIG. 2 is an illustration of an environment in which content is distributed.

The process reports, to a second entity external to the client device, the captured select field-value pairs (108). Referring briefly to FIG. 2, an example of the second external entity is content distribution monitor 202. In various embodiments, the second external entity may be the same as the first external entity. The second external entity may perform analytics based on retained data captured from the corresponding network response according to the data capture configuration.

The disclosed techniques may be applied to control client-side capture of various types of data associated with network communications. For example, the data associated with the network communications may include at least one of: network streaming data, video data, or streaming data, an example of which is shown in the following figure.

FIG. 2 is an illustration of an environment in which content is distributed. The disclosed techniques may be performed on or by components of the environment to more accurately determine the purpose and logic of network communications such as network requests and/or responses, and consequently indicate user experience and associated telemetry data. This environment is merely exemplary and not intended to be limiting as the disclosed techniques find application in any client-server communication situation including environments with a different architecture or purpose. For example, the disclosed techniques are not limited to video/media, but also provide insight into any business/process logic such as how applications handle payments, logins, enrich any aspect of user experience by recommendations, promotions, notifications, etc.

In the example shown, clients 270-284 are used to access content, such as audiovisual content (e.g., movies, songs, television shows, sporting events, games, images, etc.) that is owned by content owners. The content is stored (or captured) at origin servers 296-298, then distributed via other servers, caches, content distribution networks (CDNs), proxies, etc. (collectively, "content sources"). Content sources employ a variety of technologies and include HTTP, Adobe® Flash Media, and Microsoft® Internet Information Service servers. In some embodiments content is also distributed by clients (e.g., using peer-to-peer techniques).

Examples of clients include personal computers (270), laptops (282), cellular phones/personal digital assistants (278), and other types of information appliances (not shown) such as set-top boxes, game consoles, broadband routers, file servers, video servers, and digital video recorders, as applicable. The clients shown are used by subscribers to various Internet service providers (ISPs). For example, clients 270, 272, and 274 are subscribed to SP1 (222), while clients 276, 278, and 280 are subscribed to SP2 (224), and clients 282 and 284 are subscribed to SP3 (226).

In the example shown, a movie studio ("Studio") has contracted with content distributor 242 to provide downloadable copies of its films in exchange for a fee. Similarly, a television network ("XYZ") has contracted with content distributors 242-246 to provide viewers with access to live streams of its broadcasts as well as streams of television show episodes and sporting events. In some cases, the content distributor is owned/operated by the content owner.

Content distributor 242 has a data center that is provided with network access by backbone ISP 232. Though represented here by a single node (also referred to herein as a "CDN node"), content distributor 242 may typically have multiple data centers (not shown) and may make use of multiple backbone or other ISPs. Content distributor 244 has a data center that is provided with network access by backbone ISP 234. Advertisements are served to various clients via ad servers 250-252.

Suppose a user of client 272 (hereinafter "Alice") would like to watch a live soccer game owned by XYZ. Client 272 includes a web browser application. Alice uses the web browser application to navigate to a portal owned by XYZ, such as "http://xyztvnetwork.com/livegames." Her request for the game is directed to a CDN node that is closest to her. In this case, CDN 246 is the fewest hops away from her client. Her client then begins streaming the content from CDN 246, which is in turn rendered in her browser (e.g., via a Flash®, Silverlight®, or HTML5-based player such as ExoPlayer® or AVPlayer®). Advertisements, associated with the portal, are served to her by ad server 250.

In addition to CDN 246 and ad server 250, Alice's client is also in communication with content distribution monitor 202. As will be described in more detail below, client 272 provides status information (also referred to herein as a "heartbeat"), on a recurring basis, to content distribution monitor 202.

The status information includes a variety of telemetry data such as information that captures the quality of the user experience (e.g., video stream quality), and information pertaining to user behavior. Examples of quality metrics include: the length of time it takes for the soccer game video to start playing, the number of buffering events (if any), the length of buffering events, and the number of frames per second rendered by the video player. Examples of user behavior include: starting and stopping playing a video or audio stream, seeking within the stream, switching the player to full screen mode, minimizing/restoring the player, a change in the volume level of the player, and clicking on an advertisement. At least a portion of the telemetry data may be derived from (or, more generally, be based at least in part on) select field-value pairs captured from a network request and/or response. To generate meaningful telemetry data, the CDN may categorize all of the data to build up metrics, to respectively map the various responses into groups of events, or to define various events, depending on the particular values in field-value pairs.

As other users of clients 270-284 request content, their respective players similarly obtain content from content sources such as CDN 244 and also communicate status information (also referred to herein as telemetry information) to content distribution monitor 202. Such players may be browser-based as with Alice's, or they may be standalone applications, as applicable. In various embodiments, all clients in the environment provide status information to content distribution monitor 202.

As further described herein, one type of status information is associated with network communications such as a network request (e.g., API calls) and corresponding network response. For example, various clients may make network requests to third parties or their own backend to perform various functions related to applications. The information related to the network requests may be collected by the content distribution monitor 202 to make determinations about the status of the clients, ad servers, content distribution networks, original servers, among other things.

Content distribution monitor 202 collects and processes the information received from Alice's client along with other clients. The collected information is made available in real-time to control entities/operators and can be used to detect and remedy problems in the content distribution. Examples of such problems include excessive buffering, freezing, and frame skipping. Additional information pertaining to delivery resources (e.g., CDN 242) and network providers (e.g., ISP 226) is also made available, as is other information pertaining to clients such as demographic information.

In the example shown in FIG. 2, a single content distribution monitor 202 is used. Portions of content distribution monitor 202 may be provided by and/or replicated across various other modules or infrastructure depending, for example, on factors such as scalability and availability (reducing the likelihood of having a single point of failure), and the techniques described herein may be adapted accordingly. In some embodiments content distribution monitor 202 is implemented across a set of machines distributed among several data centers. A Resilience Service Layer (RSL) can also be used to ensure that the monitoring service is not disrupted when/if a subset of machines fail or a subset of data centers hosting the content distribution monitor are disconnected from the Internet.

In various embodiments, the collection of status information and the reporting of that information to the content distribution manager are performed by a "monitoring module" included in the client.

FIG. 3A illustrates an embodiment of a client including a content player. In the example shown, client 302 includes a content player application 304 which in turn incorporates monitoring module 306. Content is received by the player from content source 308. Monitoring module 306 is in communication with content distribution monitor 310. Monitoring module 306 may be deployed on client 302 as a software development kit (SDK).

In the example shown, module 306 is implemented in ActionScript and deployed as an SWF library that is dynamically loaded by player 304. In Flash, the NetStream( ) class is mainly responsible for streaming, buffering, and playing the video. The monitor is implemented as an element in the content player which wraps the video element, and provides the same interface as the video element, as described in more detail below.

Module 306 can also be implemented using other approaches, such as in the .NET platform for Silverlight and deployed as a DLL library that is dynamically loaded by player application 304. In Silverlight, the MediaElement( ) class is mainly responsible for streaming, buffering, and playing the video. The monitor is implemented as an element in the content player which wraps the video element, and provides the same interface as the video element, as described in more detail below.

Examples of some of the information collected by monitoring module 206 include the data related to network communications, which may be expressed in key-value pairs (sometimes called field-value pairs).

FIG. 3B illustrates an embodiment of a client including a web browser. Each of the components are like their counterparts in FIG. 3A unless otherwise described. In the example shown, client 352 includes a web browser application which in turn incorporates monitoring module 356. Content is received by the player from content source 358. Monitoring module 356 is in communication with content distribution monitor 360. In the example shown, module 356 is implemented in JavaScript. The monitor periodically collects information about the current web page and the browser.

Examples of some of the information collected by monitoring module 356 include the data related to network communications, which may be expressed in key-value pairs (sometimes called field-value pairs).

As explained above, the monitoring module can be implemented in a variety of ways. For example, the monitoring module can be included in the client's player by the author of the player. The monitoring module can also extend the functionality of an existing player, such as by being implemented as a plugin, library, or standalone application (e.g., a helper application). Various examples of techniques for integrating a monitoring module with an existing player will now be described.

In one embodiment, the monitoring module is a wrapper around the lowest level streamer module (e.g., "NetStream" in Flash, or "MediaElement" in Silverlight). The player uses the wrapper, which provides the same or enhanced version of the API provided by the streamer module, to stream video. Logic in the wrapper captures the appropriate telemetry data.

In a second embodiment, the monitoring module exists as a side attachment and is not present in the code path for streaming to occur. The player passes the streamer module to the monitoring module either directly or through a proxy module. The monitoring module reads properties and listens for events from the streamer module or proxy module to collect data. The proxy module method prevents the monitoring module from interfering with the streaming.

In a third embodiment, the monitoring module is built into the streamer module. The player uses the streamer module. The monitoring module within collects data.

Figure 4:
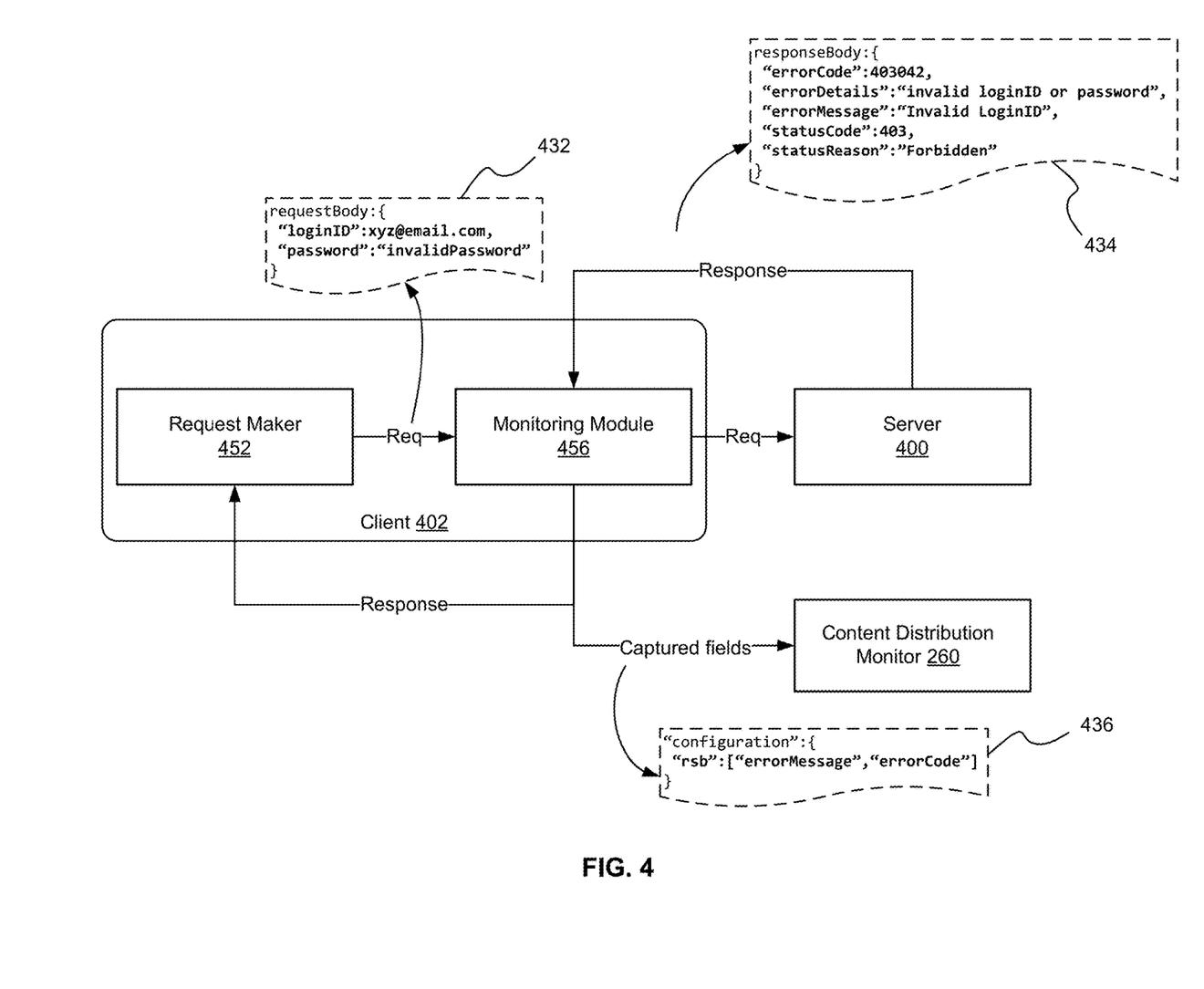
FIG. 4 is a diagram illustrating an example of client-side capture of data associated with a login failure in an embodiment.

FIG. 4 is a diagram illustrating an example of client-side capture of data associated with a login failure in an embodiment. Each of the components are like their counterparts in FIGS. 2-3B unless otherwise described.

This shows an example of a login attempt. A "login failure" refers to an attempt to login that did not succeed, for example because an authorization service received login credentials but was unable to authenticate a user, which is different from a login request that is successfully sent to and received by an authorization service. This is because after successfully receiving a login request, the authorization verifies the credentials to determine whether to provide access. Looking at the response code alone, which is the conventional technique, does not necessarily provide an accurate indication of whether a login failed. This is because the network response code will always be 200 if the login request was successfully sent to and received by an authorization service (even if login credentials are incorrect).

Another example of why considering a response code alone may be insufficient is a situation where monitoring is being performed for an internet or cable provider. The provider may offer bundles where Bundle A permits login to Service 1 and Service 2, while Bundle B permits login to Service 2 and Service 3. As another option, a user may subscribe directly to Service 1. Thus, the provider may check a user's subscription status to determine whether than may login to a particular service such as Service 1. Applying the disclosed techniques to capture value-field pairs that are indicators for login failure would help identify whether a login truly failed or succeeded as well as reasons for login failure.

The request maker 452 is the origin of a network request. An example of a request maker is an application such as content player 304 or Web browser 354. The monitoring module 456 is configured to perform the process of FIG. 1 to control client-side capture of data associated with network communications. An example of monitoring module 456 is monitoring module 306 and 356. The server 400 is configured to serve responses to requests made by request maker 452. Each of the modules 452, 456, and 400 are communicatively coupled.

In operation, request maker 452 makes a request 432 to server 400. The monitoring module 456 intercepts the request and determines fields permitted to be captured based at least in part on a data capture configuration 436. The monitoring module also intercepts the response 434 and determines fields permitted to be captured based at least in part on a data capture configuration 436. In this example, the fields permitted to be captured are specified in configuration 436, namely, capture the errorMessage and errorCode from the response body (rsb). This causes the field-value pairs "errorCode": 403042 and "errorMessage": "Invalid LoginID" from 434 to be captured. The captured field-value pairs are reported to the content distribution monitor 260, which is an example of the "second external entity" of FIG. 2.

The monitoring module 456 forwards the network request to the server 400 and forwards the network response to the request maker 452. For example, referring also briefly to 102 of FIG. 2, in response to intercepting the at least one of the network request or the corresponding network response, the process provides the network request to a server 400. As another example, in response to intercepting the at least one of the network request or the corresponding network response, the process provides the network request to the application, e.g., the request maker 452 in FIG. 4.

In various embodiments, the data capture configuration 436 includes a data model, and the data model includes at least one parameter. By way of non-limiting example, a parameter includes:

a uniform resource locator (URL) condition, a specification of at least one set of the fields permitted to be captured from at least a portion of the at least one of the network request or the corresponding network response, a format type such as JSON, and at least one size constraint.

To safeguard performance standards and reduce latency or otherwise impair the efficiency of progress, the process of FIG. 2 may be performed for network communications below a threshold size (e.g., the size constraint) in various embodiments. For example, the process if performed for network requests below 10 kB or 20 kB. The threshold may be pre-defined and adjustable.

Figure 5:
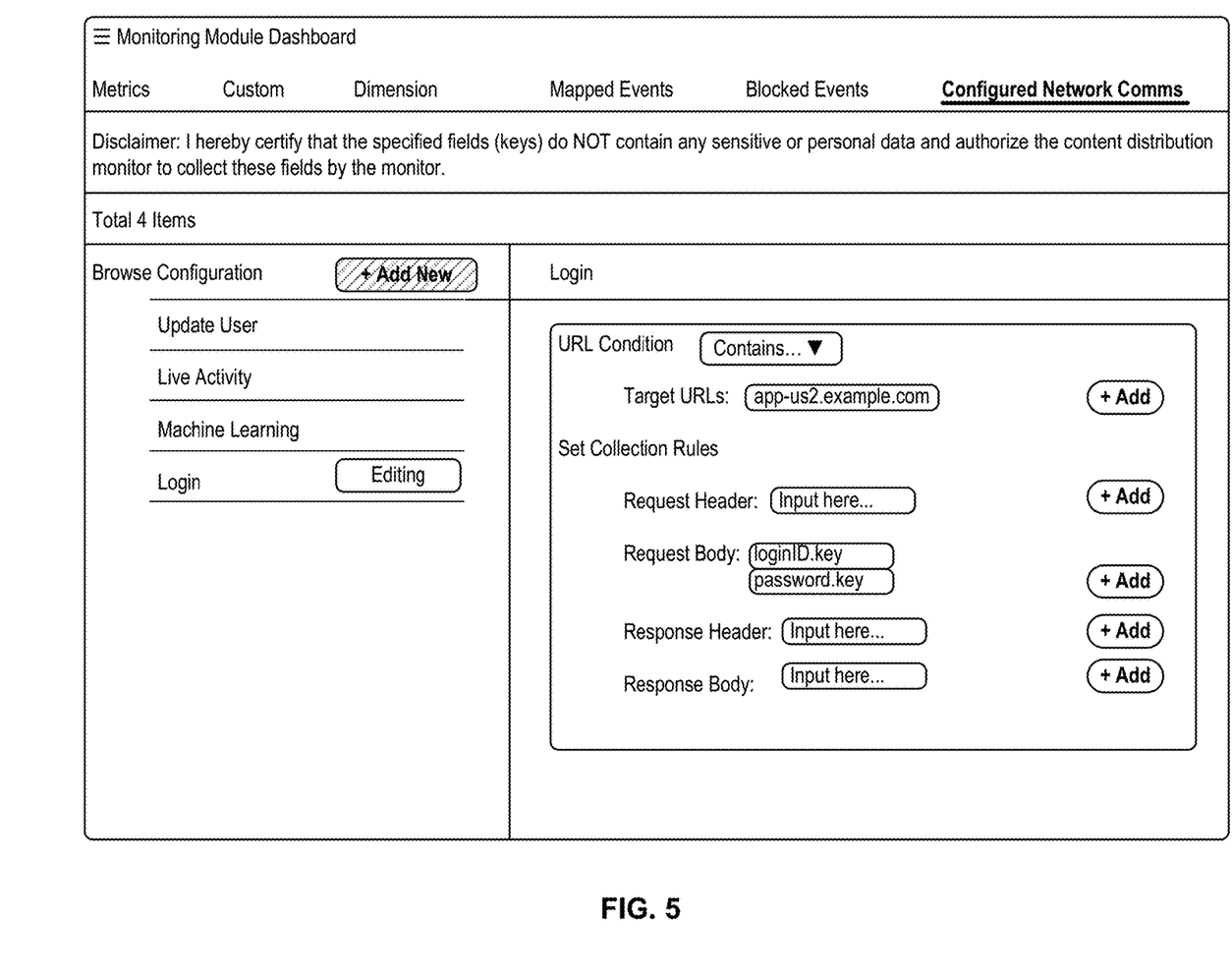
FIG. 5 is a diagram illustrating an example of configuration user interface for a data capture configuration in an embodiment.

In various embodiments, the data capture configuration is configured via a configuration user interface. The following figure shows an example of a configuration user interface.

FIG. 5 is a diagram illustrating an example of configuration user interface for a data capture configuration in an embodiment. The data capture configuration corresponds to the example shown in FIG. 4. In this example dashboard for a monitoring module (e.g., 356), network communications can be configured. The "login" data capture configuration is currently being edited. As shown in the main window (right side) of the user interface, a URL condition and target URL(s) may be specified. The URL condition may be met when a URL contains the text shown here. Alternatively a different condition such as an exact match may be specified. Collection rules refer to rules for capturing field-value pairs. In this example, a portion of the specific fields from FIG. 4 have been input, specifically those from the response body. Upon completing the fields, the data capture configuration is saved. Updates to which fields are to be captured may be made in this user interface. When a data capture configuration is saved, the information is saved and monitoring modules associated with the dashboard shown here are updated with the saved information. As further described herein, the data capture configuration may be obtained at initialization of an application and/or with periodic refreshing.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for controlling client-side capture of data associated with network communications, comprising:

a processor at a client device, the processor being configured to:

obtain, from a first entity external to the client device, a data capture configuration specifying fields permitted to be captured on the client device from at least one of a network request or a corresponding network response to the network request, wherein an application runs on the client device;

intercept, on the client device, at least one of the network request or the corresponding network response, wherein:

the network request is generated by the application, and the network request is associated with an application event;

in response to intercepting the at least one of the network request or the corresponding network response:

determine the fields permitted to be captured based at least in part on the data capture configuration; and
capture select field-value pairs from at least one of a header or a body of the at least one of: the network request or the corresponding network response according to the data capture configuration; and
report, to a second entity external to the client device, the captured select field-value pairs; and
a memory coupled to the processor and configured to provide the processor with instructions.

2. The system of claim 1, wherein the data capture configuration is obtained in response to initialization of the application.

3. The system of claim 2, wherein the data capture configuration is obtained in response to periodic refreshing of the application.

4. The system of claim 3, wherein the periodic refreshing of the application is performed at least every 30 minutes.

5. The system of claim 1, wherein in response to intercepting the at least one of the network request or the corresponding network response, the processor is further configured to provide the network request to a server.

6. The system of claim 1, wherein in response to intercepting the at least one of the network request or the corresponding network response, the processor is further configured to provide the network request to the application.

7. The system of claim 1, wherein the data capture configuration includes a data model, and the data model includes at least one parameter.

8. The system of claim 7, wherein the at least one parameter includes at least one of:
a uniform resource locator (URL) condition,
a specification of at least one set of the fields permitted to be captured from at least a portion of the at least one of the network request or the corresponding network response,
a format type, and
at least one size constraint.

9. The system of claim 1, wherein the data capture configuration is configured via a configuration user interface.

10. The system of claim 1, wherein the second external entity performs analytics based on retained data captured from the corresponding network response according to the data capture configuration.

11. The system of claim 1, wherein the processor is further configured to capture default field-value pairs.

12. The system of claim 11, wherein the default field-value pairs include at least one of: a URL associated with the network request, a time associated with the network request, or a status code associated with the corresponding network response.

13. The system of claim 1, wherein the data associated with the network communications includes at least one of: network streaming data, video data, or streaming data.

14. A method, comprising:
obtaining, from a first entity external to a client device, a data capture configuration specifying fields permitted to be captured on the client device from at least one of a network request or a corresponding network response to the network request, wherein an application runs on the client device;
intercepting, on the client device, at least one of the network request or the corresponding network response, wherein:
the network request is generated by the application, and
the network request is associated with an application event;
in response to intercepting the at least one of the network request or the corresponding network response:
determining the fields permitted to be captured based at least in part on the data capture configuration; and
capturing select field-value pairs from at least one of a header or a body of the at least one of: a network request or a corresponding network response according to the data capture configuration; and
reporting, to a second entity external to the client device, the captured select field-value pairs.

15. The method of claim 14, wherein the data capture configuration is obtained in response to initialization of the application.

16. The method of claim 15, wherein the data capture configuration is obtained in response to periodic refreshing of the application.

17. The method of claim 16, wherein the periodic refreshing of the application is performed at least every 30 minutes.

18. The method of claim 14, further comprising: in response to intercepting the at least one of the network request or the corresponding network response, providing the network request to a server.

19. The method of claim 14, further comprising: in response to intercepting the at least one of the network request or the corresponding network response, providing the network request to the application.

20. The method of claim 14, wherein the data capture configuration includes a data model, and the data model includes at least one parameter.

21. The method of claim 20, wherein the at least one parameter includes at least one of:
a uniform resource locator (URL) condition,
a specification of at least one set of the fields permitted to be captured from at least a portion of the at least one of the network request or the corresponding network response,
a format type, and
at least one size constraint.

22. The method of claim 14, wherein the data capture configuration is configured via a configuration user interface.

23. The method of claim 14, wherein the second external entity performs analytics based on retained data captured from the corresponding network response according to the data capture configuration.

24. The method of claim 14, further comprising capturing default field-value pairs.

25. The method of claim 24, wherein the default field-value pairs include at least one of: a URL associated with the network request, a time associated with the network request, or a status code associated with the corresponding network response.

26. The method of claim 14, wherein the data associated with the network communications includes at least one of: network streaming data, video data, or streaming data.

27. A computer program product embodied in a non-transitory computer readable medium and comprising computer instructions for:
obtaining, from a first entity external to a client device, a data capture configuration specifying fields permitted to be captured on the client device from at least one of a network request or a corresponding network response to the network request, wherein an application runs on the client device;

intercepting, on the client device, at least one of the network request or the corresponding network response, wherein:
    the network request is generated by the application, and the network request is associated with an application event;
in response to intercepting the at least one of the network request or the corresponding network response:
    determining the fields permitted to be captured based at least in part on the data capture configuration; and
    capturing select field-value pairs from at least one of a header or a body of the at least one of: the network request or the corresponding network response according to the data capture configuration; and
reporting, to a second entity external to the client device, the captured select field-value pairs.

28. The computer program product of claim 27, wherein the data capture configuration includes a data model, and the data model includes at least one parameter and the at least one parameter includes at least one of:
    a uniform resource locator (URL) condition,
    a specification of at least one set of the fields permitted to be captured from at least a portion of the at least one of the network request or the corresponding network response,
    a format type, and
    at least one size constraint.

* * * * *